US012251832B2

(12) United States Patent
Norton et al.

(10) Patent No.: US 12,251,832 B2
(45) Date of Patent: Mar. 18, 2025

(54) ROBOT STIFFNESS

(71) Applicant: ROLLS-ROYCE plc, London (GB)

(72) Inventors: Andrew D Norton, Derby (GB); Xin Dong, Nottingham (GB); Dragos A Axinte, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/071,345

(22) Filed: Nov. 29, 2022

(65) Prior Publication Data

US 2023/0191593 A1    Jun. 22, 2023

(30) Foreign Application Priority Data

Dec. 21, 2021    (GB) ..................................... 2118590

(51) Int. Cl.
*B25J 9/06* (2006.01)
*B25J 9/14* (2006.01)
*B25J 18/06* (2006.01)

(52) U.S. Cl.
CPC .............. *B25J 9/065* (2013.01); *B25J 9/142* (2013.01); *B25J 18/06* (2013.01)

(58) Field of Classification Search
CPC ............. B25J 9/065; B25J 9/142; B25J 18/06
USPC ...................................................... 74/490.05
See application file for complete search history.

(56) References Cited

U.S. PATENT DOCUMENTS

| | | | |
|---|---|---|---|
| 5,337,732 A | 8/1994 | Grundfest et al. | |
| 6,280,412 B1 * | 8/2001 | Pederson, Jr. | A61F 2/958 606/108 |
| 6,375,660 B1 * | 4/2002 | Fischell | A61F 2/95 623/1.11 |
| 7,771,463 B2 * | 8/2010 | Ton | A61F 2/88 623/1.11 |
| 8,550,989 B2 | 10/2013 | Dohi et al. | |
| 8,968,348 B2 * | 3/2015 | DiCaprio | A61F 2/958 623/1.11 |
| 9,526,862 B2 | 12/2016 | Iijima et al. | |
| 2002/0147491 A1 * | 10/2002 | Khan | A61F 2/958 623/1.11 |
| 2005/0060030 A1 * | 3/2005 | Lashinski | A61F 2/2466 623/2.37 |
| 2008/0147000 A1 * | 6/2008 | Seibel | A61M 25/0155 604/528 |

(Continued)

FOREIGN PATENT DOCUMENTS

GB    2531576 A    4/2016

OTHER PUBLICATIONS

May 19, 2023 Extended Search Report issued in European Patent Application No. 22208746.2.

(Continued)

*Primary Examiner* — T. Scott Fix (74) *Attorney, Agent, or Firm* — Oliff PLC (57) ABSTRACT

A continuum arm robot comprising: a tool, a tip section comprising a number of sections a manipulatable robotic section having multiple degrees of freedom, a stiffening section comprising a passive core with an inflatable section surrounding the passive core and a valve for allowing a fluid into the inflatable outer; and a passive section comprising a length of flexible conduit, wherein the core of the passive section and the stiffening section contain the cables for manipulating the tip section and the fluid conduit for supplying the fluid to the inflatable outer.

14 Claims, 6 Drawing Sheets

(56) References Cited

U.S. PATENT DOCUMENTS

| | | | |
|---|---|---|---|
| 2012/0067158 A1* | 3/2012 | Kell | B25J 18/06 |
| | | | 74/490.04 |
| 2020/0191172 A1* | 6/2020 | Norton | B25J 15/0095 |
| 2021/0108536 A1* | 4/2021 | Trivedi | G01M 15/14 |
| 2021/0115809 A1* | 4/2021 | Trivedi | B23P 6/002 |

OTHER PUBLICATIONS

Jun. 7, 2022 Search and Examination Report Issued in British Patent Application No. GB2118590.5.

Zuo, et al.; "Variable stiffness outer sheath with 'Dragon skin' structure and negative pneumatic shape-locking mechanism"; International Journal of Computer Assisted Radiology and Surgery; vol. 9; 2014; pp. 857-865.

"RANDE—Non-destructive Inspection"; OC Robotics' Aerospace Case Studies; https://web.archive.org/web/20190915071909/http://www.ocrobotics.com:80/rande-nondestructive-inspection/.

Telleria, et al.; "Modeling and Implementation of Solder-activated Joints for Single-Actuator, Centimeter-scale Robotic Mechanisms"; 2010 IEEE International Conference on Robotics and Automation; May 2010; pp. 1681-1686.

Zuo, et al.; Developing Essential Rigid-Flexible Outer Sheath to Enable Novel Multi-piercing Surgery; MICCAI 2012; 2012; pp. 26-33.

Chirikjian, Gregory S. and Burdick, Joel W.; "Kinematically Optimal Hyper-Redundant Manipulator Configurations"; Proceedings of the 1992 IEEE; May 1992; pp. 415-420.

Dong, et al.; "In-situ repair/maintenance with a continuum robotic machine tool in confined space"; Journal of Manufacturing Progress; vol. 38; Feb. 2019; pp. 313-318.

Sadeghi, A.; "Innovative Soft Robots Based on Electro-Rheological Fluids"; 2012 IEEE/RSJ International Conference on Intelligent Robots and Systems; Oct. 2012; pp. 4237-4242.

Trivedi, et al.; "Geometrically Exact Models for Soft Robotic Manipulators"; IEEE Transactions on Robotics; vol. 24; Aug. 2008; pp. 773-780.

Wright, et al.; "Design and Architecture of the Unified Modular Snake Robot"; 2012 IEEE International Conference on Robotics and Automation; May 2012; pp. 4347-4354.

Dong, et al.; "Development of a slender continuum robotic system for on-wing inspection/repair of gas turbine engines"; Robotics and Computer-Integrated Manufacturing; vol. 44; 2017; pp. 218-229.

Jiang, et al.; "Design of a Variable Stiffness Flexible Manipulator with Composite Granular Jamming and Membrane Coupling"; 2012 IEEE/RSJ International Conference on Intelligent Robots and Systems; Oct. 2012; pp. 2922-2927.

Nadia G. Cheng; "Design and analysis of active fluid-and-cellular solid composites for controllable stiffness robotic elements"; Massachusetts Institute of Technology; 2009; pp. 1-3.

Cheng, et al.; "Design and Analysis of a Soft Mobile Robot Composed of Multiple Thermally Activated Joints Driven by a Single Actuator"; 2010 IEEE International Conference on Robotics and Automation; May 2010; pp. 5207-5212.

Shang, et al.; "An Articulated Universal Joint Based Flexible Access Robot for Minimally Invasive Surgery"; 2011 IEEE International Conference on Robotics and Automation; May 2011; pp. 1147-1152.

Simaan, et al.; "A Dexterous System for Laryngeal Surgery"; Proceedings of 2004 IEEE International Conference on Robotics & Automation; Apr. 2004; pp. 351-357.

Ota, et al.; "A Highly Articulated Robotic Surgical System for Minimally Invasive Surgery"; The Annals of Thoracic Surgery; vol. 87; Apr. 2009; pp. 1253-1256.

Kim, et al.; "A Novel Layer Jamming Mechanism With Tunable Stiffness Capability for Minimally Invasive Surgery"; IEEE Transactions on Robotics; vol. 29; Aug. 2013; pp. 1031-1042.

* cited by examiner

ROBOT STIFFNESS

This specification is based upon and claims the benefit of priority from UK Patent Application Number 2118590.5 filed on 21 Dec. 2021, the entire contents of which are incorporated herein by reference.

BACKGROUND

Overview of the Disclosure

The disclosure relates to a means of stiffening a continuum arm robot. In particular, the disclosure relates to a means of stiffening sections of continuum arm robots via means of inflatable sections.

BACKGROUND OF THE DISCLOSURE

Continuum arm or snake arm robots are of growing interest in a number of applications. This is because the robots can be manipulated into spaces in which other robotic systems or human operators cannot readily access. This is due to the ability to manipulate the body with a number of degrees of freedom so that the end of the tool can be positioned accurately and easily. This positioning is controlled by actuators which manipulate the tendons within the robot so that each joint of the arm can be individually controlled to within a high degree of positional accuracy.

Most robotic arm systems have 6 degrees of freedom or less. However, if a task requires a greater amount of dexterity the number of degrees of freedom required is increased. This increase in the number of degrees of freedom means that the arms are able to operate in confined areas, for example in maintenance of complex structures or for use in minimally invasive surgery. Continuum arm robots are designed along two main paths: Firstly, there are snake-like robots, which consist of multiple rigid-link sections that are connected by either a rigid R/U/S (Revolute/Universal/Spherical) joints or by a compliant joint. Each section is composed of one or more segments and controlled independently from the others with on-board or remote actuation. Secondly, there are continuum robots, which consist of a compliant backbone whose local and global deformation is controlled by one or more actuators.

Despite the functionality there are issues with the current designs of highly compliant robots, which result from the number of joints required in the robot arm. As a consequence of these joints the robot arm suffers from a low degree of stiffness when compared to conventional 6 degrees of freedom robots. This reduced stiffness results in a reduced load carrying capacity as well reducing the interaction that the arm can have with the environment within which it is operating. The current state of the art aims to overcome this by "freezing" the system through locking the actuator or by the addition of stiffening means to the backbone. This can work for shorter length robotic arms, however, when employed on longer length robots the arms act like long cantilever beams and the deflection of the beams causes significant position and navigation issues. This limits the use of such robots to lightweight tasks for risk of damaging the robot and/or the object that the robot is working on. Therefore, there is a requirement for an improved continuum arm robot system to overcome these issues.

SUMMARY OF THE DISCLOSURE

The first aspect of the disclosure relates to a continuum arm robot comprising: a tool or effector, a tip section comprising a number of sections a manipulatable robotic section having multiple degrees of freedom, at least one stiffening section comprising a passive core with an inflatable section surrounding the passive core and a valve for allowing a fluid into the inflatable outer; and a passive section comprising a length of flexible conduit, wherein the core of the passive section and the stiffening section contain the cables for manipulating the tip section and the fluid conduit for supplying the fluid to the inflatable outer.

The inflatable section may be located between the tool or effector and the tip section.

The inflatable section may be located in the tip section.

The inflatable section may be located between the tip and the passive section.

There may be a plurality of inflatable sections.

The inflatable section may be made from elastic materials such as rubber, silicone rubber, latex rubber.

The inflatable section may comprise an upper layer of elastic material and a lower layer of elastic material that join to form a balloon around the core of the stiffening section.

The inflatable sections may feature proximal and distal end sections which have a sealing mechanism comprising a grip section which is attached to discs of the stiffening section, the grip section couples with a grip section of an inflatable section support, the inflatable section support links to the upper layer of elastic material, the end section also features a sloping section that extends proximal to the gripping mechanism and is connected to the inner elastic membrane and wherein the sloping section allows the upper elastic layer to sit within a pocket so that the outer elastic layer sits within the recess formed by the sloping sections when not in the inflated state.

The stiffening section may comprise a plurality of inflatable sections.

The level of fluid may be controlled within the inflatable sections so that continuum arm robot can be moved or manipulated to a different location.

The passive section may be constructed from a plurality of flexible tubes with the cables and supply tubes running through the flexible tubes.

The tip section may comprise a length of 6 or greater degrees of freedom continuum arm robot.

Constrictions may be placed around the inflatable section, to adjust the shape of the inflatable section.

The constrictions may consist of any one of tape, metallic structures, ribbing, and/or bands.

The inflatable section may have different thicknesses allowing so that it expands non-uniformly.

The inflatable section may be filled with liquid or gas to control the stiffness of the stiffening section.

The inflatable section may be filled with water or liquid nitrogen.

According to a second aspect of the disclosure there is provided a method of using a continuum arm robot as set out above comprising:
  inserting the continuum arm robot into a cavity of a workpiece until it reaches the desired positioning;
  inflating the stiffening section until the outer stiffening section holds the continuum arm robot in position;
  performing the desired task using the tip section of the continuum arm robot;
  deflating the stiffening section of the continuum arm robot;
  and extracting the continuum arm robot.

Once the desired task has been performed the inflatable section may be partially deflated so that the tip can be moved to a new position and a second task can be performed on a new section of the workpiece, before the inflatable section is deflated.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1A:
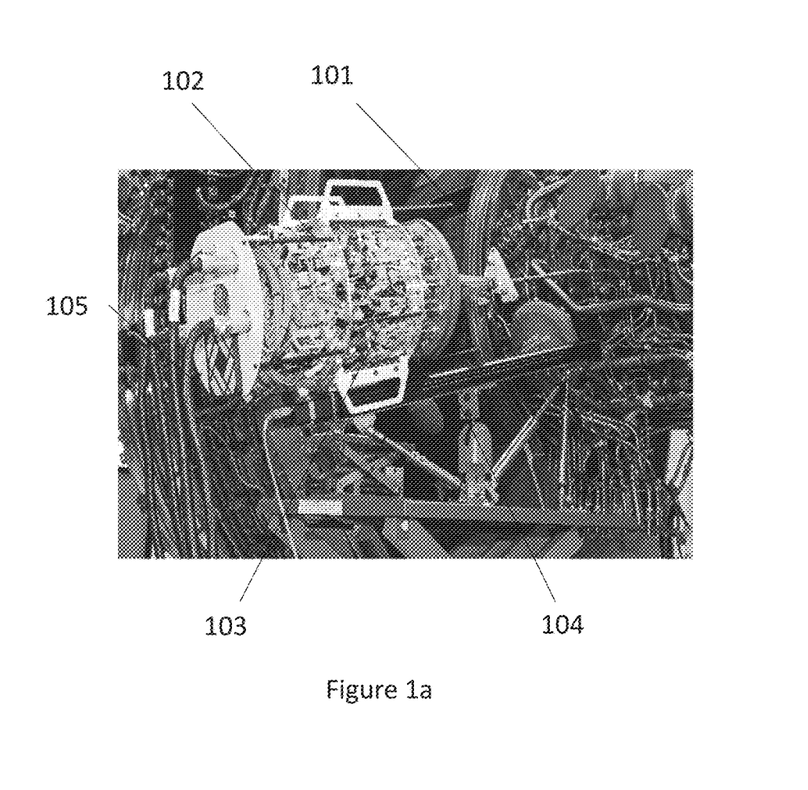
FIG. 1a presents a prior art example of a cut away of a continuum arm robot.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint, which allows the continuum arm to bend. The actuator pack is shown being positioned on a rail or support 104, which is positioned close to the component to be inspected. The actuator is also provided with a plurality of power and signal cables 105 that are used to power and address the actuators. The individual signals across the range of actuators provide control of the joints such that the continuum arm 101 can be directed. Not shown in FIG. 1 is that there is also a need for an operator with a computing device that is linked to the actuator to control movement of the continuum arm and to perform the desired task. As the continuum arm is permanently integrated into the actuator pack if a different tool is required it requires the use of a complete continuum arm robot system including the actuator. The computing device that is connected to the prior art actuator may be any suitable computing system such as a laptop computer featuring the requisite operating software for the robot and a control input such as a joystick, which allows the continuum arm to be controlled.

Figure 1B:
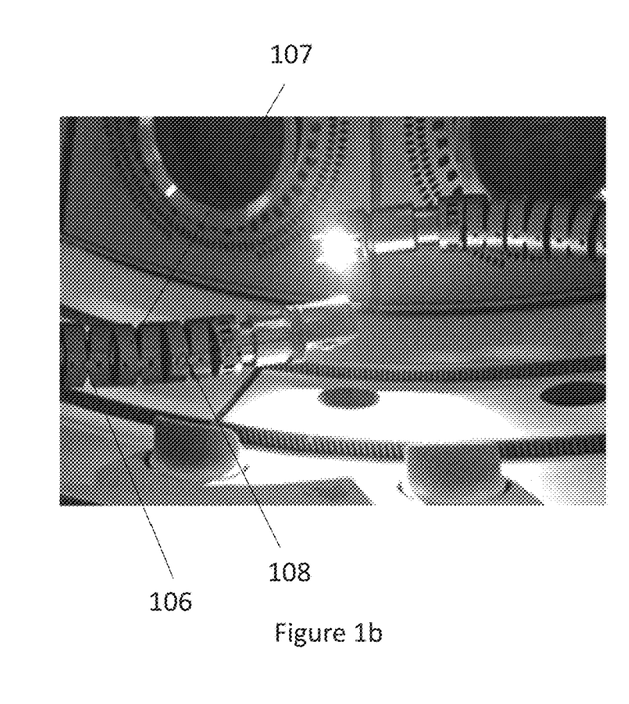
FIG. 1B presents an example of the joints of a continuum arm robot.

FIG. 1b shows an example of the joints of a continuum arm robot. The arm comprises multiple joints, which require at least 2 cables per joint. For example, a system having three joints, each having 4 tendons per joint will require 12 actuators to drive. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to be able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets characteristics such as the minimum bending radius and the requirements for the torque that is required to cause a resultant change within the joint. It is the presence of the space in the joints that allows the joint to move and the ease of movement of the joint that results in a low stiffness of the arms in comparison to other robotic arms of the same length. This is because the structural behaviour of a snake-like robotic manipulator can be compared to a cantilever beam under load; this is because the system is fixed on one end to the base with actuation pack and the remainder of the arm is used to navigate through the environment without other points of contact. In this condition, every load applied on the body and/or the tip of the snake-like robot, including its own weight, imposes a significant deflection from the ideal position. At the end of the arm there is positioned a tool or probe that is designed to perform one or more functions once the continuum arm is in position. The heads of the continuum arm robots are often provided with optical systems so that the operator is able to view the head as it is being inserted into the component and to be control the head as it performs its tasks. The optical system is also frequently coupled to an illumination system. The control cables for the tool, electrical power connectors to the illuminations system and optical cables usually are able to run through the centre of the joints within the continuum arm. This has the benefit of protecting the cables form any potential damage.

Figure 2:
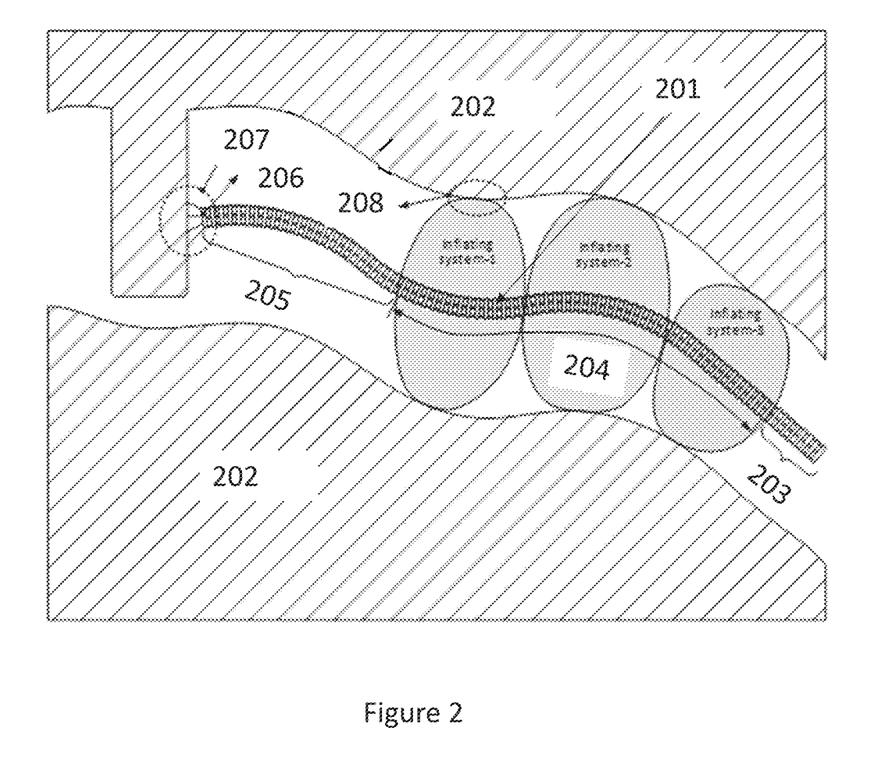
FIG. 2 presents an example of the use of a continuum arm robot according to the present disclosure.

FIG. 2 presents an example of a continuum arm robot according to the present disclosure. In this the continuum arm 201 is inserted into a cavity 202 of an object to be inspected or repaired. The continuum arm robot 201 contains a number of sections having moveable joints to allow the robot to be manipulated into position. The continuum arm section that is closest to the actuator and furthest from the head of the continuum arm is the passive section 203. The passive section is a non-controllable section, which is flexible and allows the control tendons and the power and device supplies to pass through whilst protecting them. The middle section of the continuum arm robot consists of an inflatable section 204. The inflatable section of the present example comprises three inflatable systems, however, the continuum arm robot may contain any suitable number of inflating systems. The inflating systems extend from the outer surface of the continuum arm robot and expand to contact the surface wall of the object to be inspected. The balloon has a contact area with the wall 208, through which the inflation of the inflatable section imparts a force on the wall of the workspace or cavity 202. The presence of the inflating systems positions the continuum arm robot in the centre of the cavity of the object that is being worked on; this is because the inflatable section creates a force on the outside of the wall of the cavity which is used to position the arm. However, depending upon the nature of the inflation systems the continuum arm section may be positioned at anywhere that the inflatable system supports. The active sections 205 are positioned at the head of the continuum arm robot close to the actuator or head of the continuum arm robot. The continuum arm robot has an end effector 206 which is able to inspect an inspection area 207 of the target of the object that is being worked on. The inflatable system can be made from elastic materials such as rubber, silicone rubber, latex rubber or any other suitable material that will be apparent to the person skilled in the art. The size of the inflating mechanism can be actively controlled; this allows the robot system to adapt to the working conditions of the continuum robot, whether this is accessing a small size cavity or operation in a large cavity.

Although presented above with the inflatable section being in between the passive and active section, the inflatable section may also be placed in the active section. This can be done by separating the sections to feature an inflatable section or by placing the inflatable section around the active section. Alternatively, the inflatable section can be placed between the active section and the end effector. In these cases, the inflatable section can be inflated once the effector is in position to hold it in place during operation.

In use, when the continuum robot is inserted, the inflating systems are in their natural size—that is to say, that the outer diameter of the inflating system is designed to be the same as the overall diameter of continuum robot. This enables easy navigation of the continuum robot to the desired position. However, the inflatable section may extend a small distance from the diameter of the continuum robot; this would be the case in which the inflatable section goes around the active section. In the operation stage the size of the inflating system is actively adjusted by inflating the volume by pumping a fluid such as air, water, and/or oil into the volume between the outer and inner surfaces of the inflating system. The fluid for this can be supplied through tubes either in the conduit at the centre of the snake or on the outside of it. A sensor may be used to determine if the inflatable section is correctly inflated. This could be done through the use of a pressure sensor. Through appropriate parameter design and material selection, the inflating system is able to fix the continuum robot within a confined tube/access cavity. This fixing improves the stiffness of the end-effector, thus increasing its versatility and accuracy. Additionally, the use of an inflating system can also provide a good solution to allow the continuum robot to adapt to confined environments with different shapes. Furthermore, the use of an inflating system is beneficial to the operation of the continuum arm robot as it allows the robot arm to be secured in position, so that it cannot move whilst the end effector is in use. Due to the continuum arm being held in position it means that the dimension of the continuum robot in a normal stage can be minimised. This is because you do not need to increase the size of the robot to produce a greater strength and resistance to counter forces on the robotic arm. By providing contact between the continuum robot and the chamber/wall during operation decreases the length of the cantilever effect within the system and therefore it has the effect of increasing the system stiffness. The ability to inflate and deflate the inflation system means that the system can be used reliably and repeatedly in different locations, as the robot is able to safely be inserted into and removed from the cavity.

Figure 3:
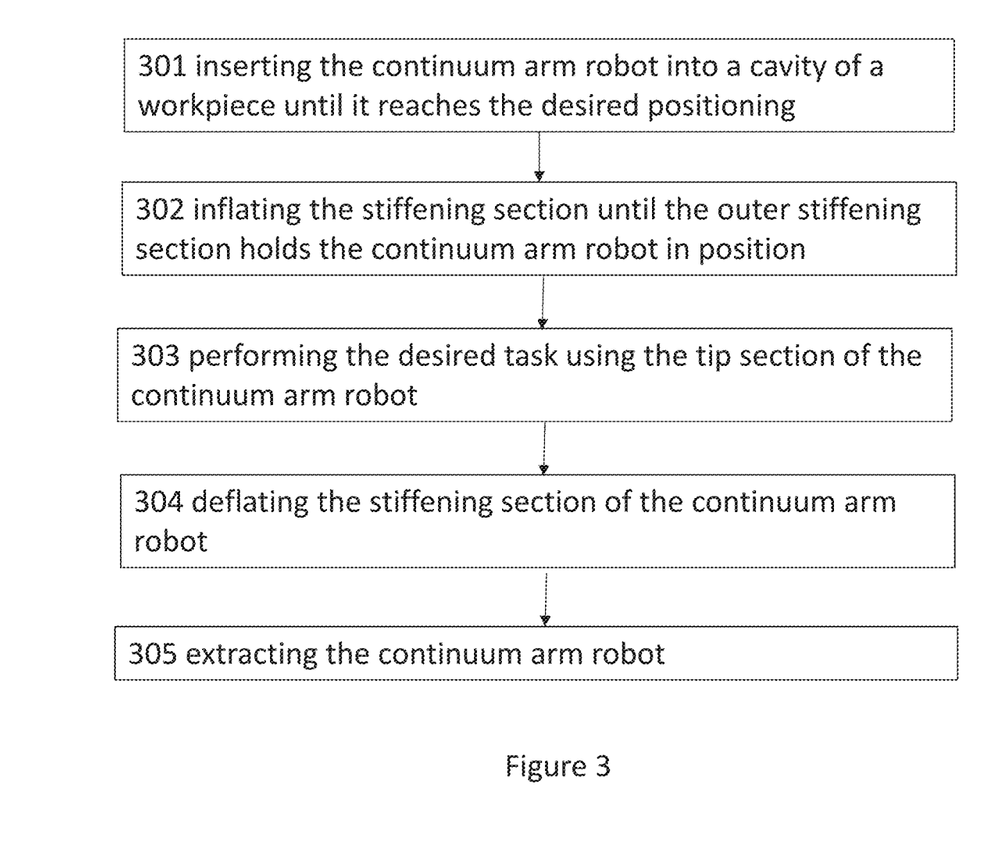
FIG. 3 presents a flow chart of the operation of the continuum arm robot of the present disclosure.

The working principle of the above inflating system continuum arm robot is shown in FIG. 3. The first step 301 is to insert the continuum arm robot into the cavity that will direct the tool to its working position. Whilst doing this the stiffening sections are in their natural size, that is to say without the inflation of the balloons. This means that the continuum arm robot can be easily inserted into the chamber/cavity. The use of long passive sections allows the inflation systems to be positioned close to the head of the continuum arm robot. If it is desirable the passive section may also feature an inflation system to minimize the contact between the continuum arm robot and the cavity. In the second step 302 once the tip or head of the continuum arm robot is place in its desired position the inflation system can be activated. To do this the air/fluid is pumped into the stiffening inflation mechanism. The expansion of the inflation system caused the outer wall of the inflation system to come into contact with the wall of the cavity. The pressure and friction of the outer wall of the inflation system coming into contact with the wall of the cavity has the effect of fixing or locking the continuum robot within the cavity. In the third step 303, as the inflating sections have been inflated and the continuum arm robot is securely positioned within the cavity the tip section is able to perform its desired task. The use of the inflating system increases the stiffness of the system and allows the robot arm to perform a greater range of tasks than it would be able to perform without the presence of the inflating system. In the fourth step 304, once the operation that was carried out by the robot head has been completed, the inflating system can be deflated. The deflation is carried out by exhausting the balloons of their air or fluids; this is done by either releasing a valve in the case of an air, or alternatively pumping out the air or fluid that is used to fill the inflating system. This reduces the balloons of the inflation systems back down to their natural size. The continuum arm robot is thus in the same state as is it was when it was inserted. The fifth step 305 is the extraction of the continuum arm robot from the cavity. This is possible as the continuum arm robot has been returned to the state with which it was inserted into the cavity in, therefore the robot is able to be exit through the same port through which it entered—for example an inspection hole in a gas turbine engine.

Figure 4A:
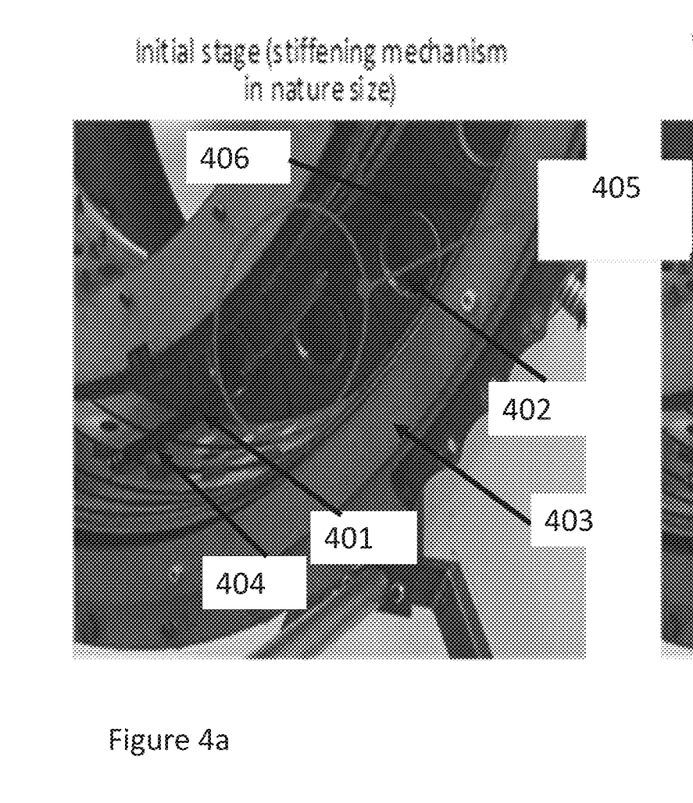
FIG. 4a presents an image of the insertion of the continuum arm robot into a workspace in its undeployed state and FIG. 4b presents an example of the continuum arm robot in its deployed state.
Figure 4B:
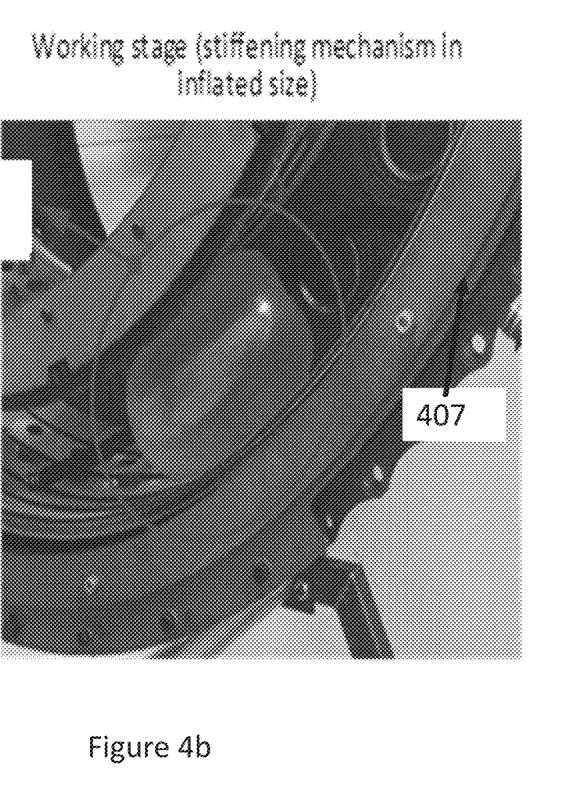

FIG. 4a shows a figure of the insertion of the continuum arm robot 401 into a cavity 402 within a component 403. The continuum arm robot has an actuator head 404, an inflatable section 405 and a passive section 406. The continuum arm robot has been inserted into a cavity through an access port 407. In the image the inflatable section has not been inflated and as such the strength of the tip of the continuum arm robot is provided by the strength of the joints and the sections of the continuum arm robot. In such a state there is a limit in the load or the capability of the end of the actuator. FIG. 4b shows an example of the continuum arm robot in its deployed state. In this state the inflatable section 405 has been inflated such that the outer section of this is in contact with the walls of the cavity. In this state the inflatable section is able to enact a force on the cavity which in turn also provides a force on the continuum arm robot that passes through the inflatable section. Thus, the inflatable section of the continuum arm robot in the deployed state acts as a stiffening mechanism. With this in place the stiffness of the continuum arm robot is increased and as such the load that can be applied to the end or actuator at the end of the robot is increased. Consequently, the robot has an increased load capability for the same size. Therefore, this acts to increase the capability.

Figure 5:
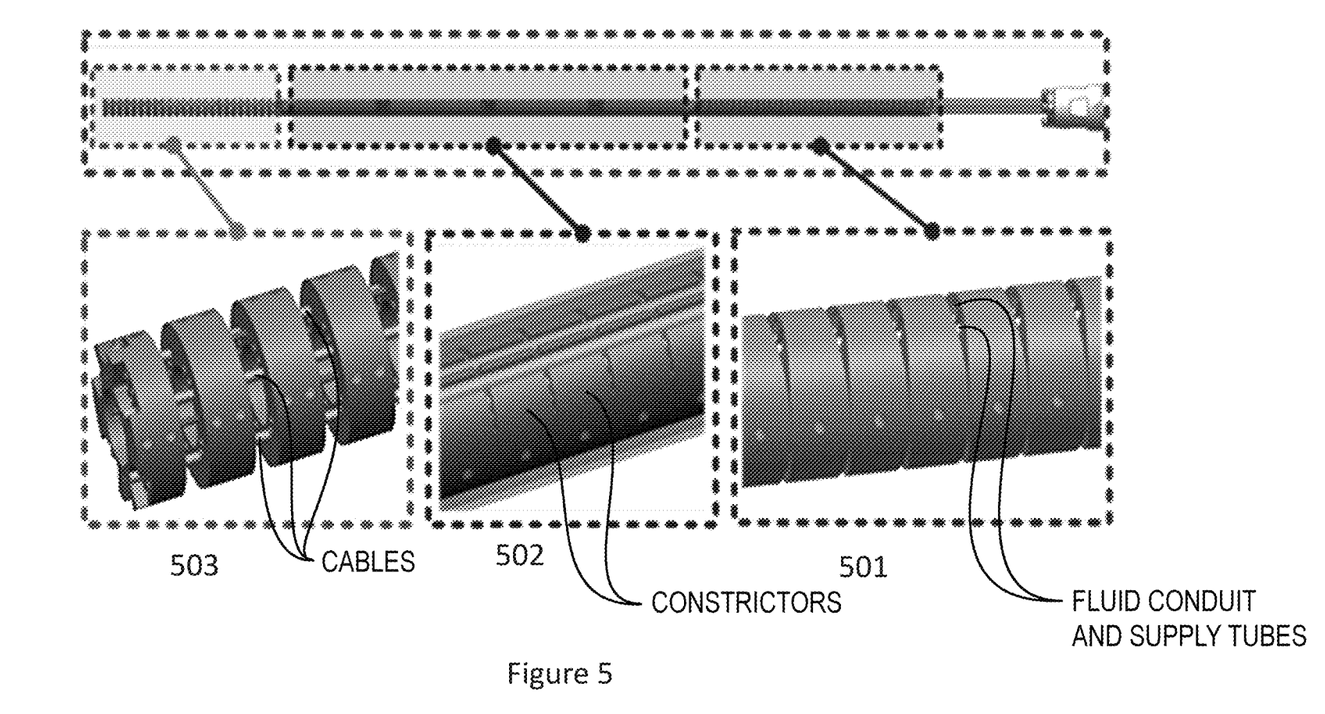
FIG. 5 presents a sectional view of the continuum arm robot of the present disclosure.

FIG. 5 presents a sectional view of a continuum arm robot of the present disclosure. The figure shows a closer look at the three separate sections of the continuum robot of the present disclosure. In this the body of the continuum arm robot is constructed of three independent sections, each of which have their own function. This consists of the passive section 501, which is a flexible length of the robot over which there is no control. The passive section has suitable stiffness to assure of easy delivery of the continuum robot into the working area. The passive section is designed such that it is capable of supporting the actuating cables and other deliverable tubes and pipes as required by the tip as well as conduit for supplying the fluid required by the inflating mechanism. The passive section may be any suitable length to allow the continuum arm robot to be able to access the required area. The stiffening section 502 sits between the passive section 501 and the tip section 503. In this example, the stiffening section is also passive as the sections of the continuum robot are not manipulated by actuator. Surrounding this section is either a single or multiple inflatable sections. These consist of a skin that extends around the continuum arm section in that region. The skin must form a sealed section around the section so that it can be inflated to support against the walls of the cavity. The skin must be made of a material that is able to deform under pressure from the fluid that is used to inflate the balloon, but at the same time strong enough and tear resistant, so that it does not rip if it catches a rough surface. The robotic section has an inlet and/or outlet for supplying and removing fluid into and out of the balloon. The final section of the continuum robot is the tip section; this is a controllable section of robot that in this example is a section of continuum robot having 6 degrees of freedom. The end of the tip section may have an actuator or tool depending upon the work and process that is required to be carried out. The tip section may be any suitable length and have any suitable number of moveable sections within it to perform the required task.

Figure 6A:
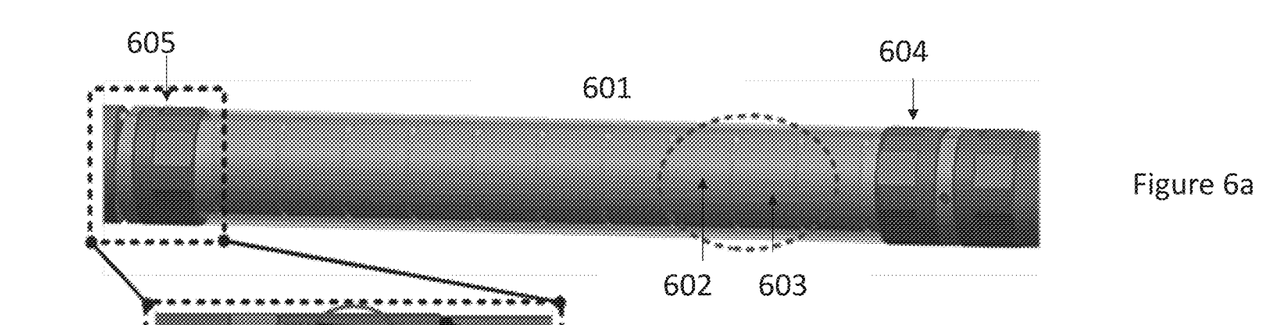
FIG. 6a which presents a close-up view of the stiffening section of the continuum arm robot of the present disclosure and FIG. 6b presents a close up view of the distal end of the inflatable section of the continuum arm robot.
Figure 6B:
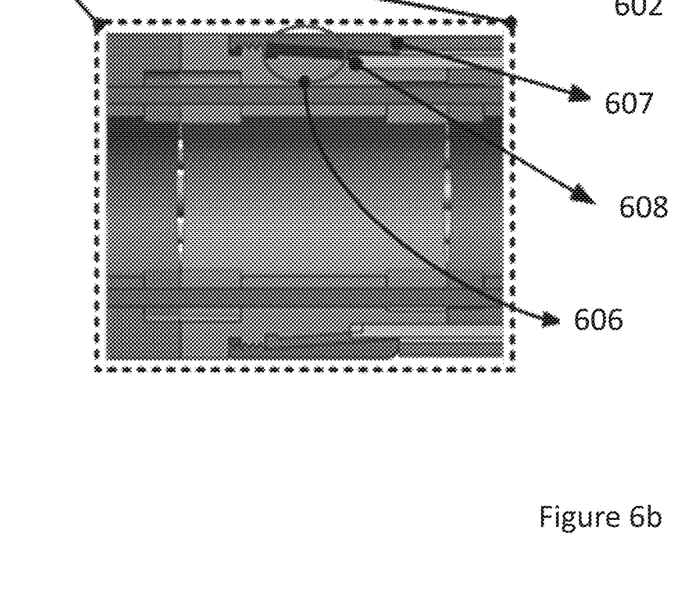

In order to make sure that the overall continuum robot can be delivered into the chamber through the inspection hole, the stiffening section should be flexible enough to allow it to be manipulated into the space. Therefore, a structure that combines multiple backbones and the stiffening mechanism consisting of an inflatable structure is used. Such requirements can be achieved utilising a thin stiffening mechanism constructed from two layers of the hyper elastic film that covers a number of the disc sections of the backbone. Thus, the stiffening section can have the same characteristic as the conventional continuum robot but, can be actively pumped with a fluid to increase the diameter in order to fill the cavity and thus increase the stiffness of the robot. A detailed example of this is shown in FIG. 6a which presents a close-up view of the stiffening section of the continuum arm robot of the present disclosure. Within the stiffening section 601 of the continuum arm robot there are a number of discs 602 and 603 to provide the requisite stiffness and flexibility in order to deliver and support the continuum robot for insertion into the cavity work area. This section is broken into two ends a proximal end 604 and a distal end 605 relative to the actuator. These ends support the inflatable section and secure it to the continuum robot. There may be one or more of the inflatable sections provided on the stiffening section. FIG. 6b presents a close-up view of the distal end of the inflatable section of the continuum arm robot. The ends contain a sealing mechanism for the inflatable to support the inflatable section. This comprises a grip section 606 which is attached to discs of the stiffening section of the continuum robot. This grip section couples with an inflatable section support. The inflatable section support is designed to link to the inflatable balloon section but provides a looser coupling than linking it to directly to the disc of the stiffening section. However, as the skilled person would appreciate there are a number of ways the inflatable balloon of the stiffening section can be coupled to the stiffening section body, including directly coupling the balloon to the discs. The inflatable section support is coupled to a super elastic membrane 607 that forms the outer layer of the balloon. The end section features a sloping section that extends proximal to the gripping mechanism. The sloping section allows the super elastic layer to sit around the discs of the support section without increasing the diameter of the arm; this is because any change in diameter of the arm reduces the accessibility of the continuum arm robot and also provides a section which may catch on edges of the cavity. Coupled to the sloping section is a lower layer 608 of super elastic material that forms the inner portion balloon of the stiffening section.

The tip section may have a number of tools and or actuators attached to it. In addition to the tool or the actuator, which require their own controls that are required to pass along the body of both the passive and stiffening sections of the continuum arm robot, there are also the control cables of the actuator that are required for the 6 degree of freedom manipulation of the tip section. Therefore, the design of the passive and stiffening section requires careful design so that they have channels to allow for the supply of these cables without increasing the overall diameter of the continuum arm robot. A means of doing this may be in the passive sections to use a number of linked flexile rods with the joints at the end of the rods becoming flexible joints that connect to form a flexible backbone. In the stiffening section as shown in FIGS. 6a and b of the present disclosure the long flexible rods are replaced by the air fluid channels, which contain all the requisite cables at the centre of this section.

The advantage of the system is that the thickness of the balloon walls may be tailored to provide an optimum level of expansion and structural integrity. It is known that thicker walls expand less but are less sensitive to puncturing within a working environment. It may also be possible to tailor the thickness of the balloon. Thus, the thickness of the balloon can be adjusted across its length to provide for an asymmetrical expansion. For example, a thicker wall on one edge will cause the balloon to expand in a U-shape; this can be used to match the shape of the cavity into which the continuum arm robot is inserted. As such, it is possible to tailor the inflatable sections to fit the cavity. An alternative way to control the shape of the balloon is the use of constrictions. These constrictions can be placed on the outside of the balloon structure to provide an asymmetrical expansion. The constrictions may be of any suitable structure or nature as would be apparent to the person skilled in this art; this may include the use of thick tape, metallic structures, ribbing, or bands. A further way of adjusting the stiffness of the stiffening section could be to expand them using different gases or fluids, so that the expansion profile and structural integrity is optimized. For example, the balloons could be water filled to provide greater stiffness than would be the case if the balloons are filled with air. Alternatively, the balloons could be supercooled using liquid nitrogen or other mechanisms to provide enhanced stiffness within the environment. In order to increase the functionality of the robot the stiffness of the structures can be controlled in the environment by actively adjusting the air flow rate and pressure. As such, the movement of the robot in the environment can be controlled. For example, the balloons can be slightly deflated to allow the robot to be deployed even further into the engine; these can then be reinflated when the tool is at the correct location relative to the damage that needs maintenance.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A continuum arm robot comprising:
   a tool;
   a tip section at a tip end of the continuum arm robot, the tip section comprising a manipulatable robotic section having multiple degrees of freedom;
   a stiffening section comprising, within the stiffening section, a passive core with an inflatable section with at least one inflatable volume that by itself surrounds the passive core and a valve for allowing a fluid into the inflatable section; and
   a passive section comprising a length of flexible conduit; wherein
   the passive core and the stiffening section contain cables for manipulating the tip section and a fluid conduit for supplying the fluid to the inflatable section, and
   the stiffening section is between the passive section and the tip section, wherein
   the inflatable section comprises an upper layer of elastic material and a lower layer of elastic material that join to form a balloon around the core of the stiffening section, and proximal and distal end sections which have a sealing mechanism comprising a grip section attached to discs of the stiffening section,
   the grip section couples with a grip section of an inflatable section support,
   the inflatable section support links to the upper layer of elastic material,
   the end section comprises a sloping section that extends proximal to a gripping mechanism and is connected to an inner elastic membrane, and
   the sloping section allows the upper layer of elastic material to sit within a pocket so that the upper layer of elastic material sits within a recess formed by the sloping sections when not in an inflated state.

2. The continuum arm robot according to claim 1, wherein the inflatable section is made from elastic materials.

3. The continuum arm robot according to claim 1, wherein the stiffening section comprises a plurality of inflatable sections.

4. The continuum arm robot according to claim 3, wherein the level of fluid can be controlled within the plurality of inflatable sections so that continuum arm robot can be moved or manipulated to a different location.

5. The continuum arm robot according to claim 1, wherein the passive section comprises a plurality of flexible tubes with the cables and supply tubes running through the flexible tubes.

6. The continuum arm robot according to claim 1, wherein the tip section comprises a 6 or greater degrees of freedom continuum arm.

7. The continuum arm robot according to claim 1, wherein constrictions are around the inflatable section to adjust the shape of the inflatable section.

8. The continuum arm robot according to claim 7, wherein the constrictions comprise tape, metallic structures, ribbing, and/or bands.

9. The continuum arm robot according to claim 1, wherein the inflatable section has different thicknesses allowing so that it expands non-uniformly.

10. The continuum arm robot according to claim 1, wherein the inflatable section can be filled with liquid or gas to control the stiffness of the stiffening section.

11. The continuum arm robot according to claim 10, wherein the inflatable section is configured to be filled with water or liquid nitrogen.

12. A method of using a continuum arm robot according to claim 1 comprising:
    inserting the continuum arm robot into a cavity of a workpiece until it reaches the desired positioning;
    inflating the stiffening section until the stiffening section holds the continuum arm robot in position;
    performing the desired task using the tip section of the continuum arm robot;
    deflating the stiffening section of the continuum arm robot;
    and extracting the continuum arm robot.

13. The method of claim 12, wherein once the desired task has been performed the inflatable section is partially deflated so that the tip can be moved to a new position and a second task can be performed on a new section of the workpiece, before the inflatable section is deflated.

14. The continuum arm robot according to claim 1, wherein the inflatable section is made from at least one of rubber, silicone rubber, and latex rubber.

* * * * *